Inventors:
Larry C. Frazier,
Edwin E. Mallory,

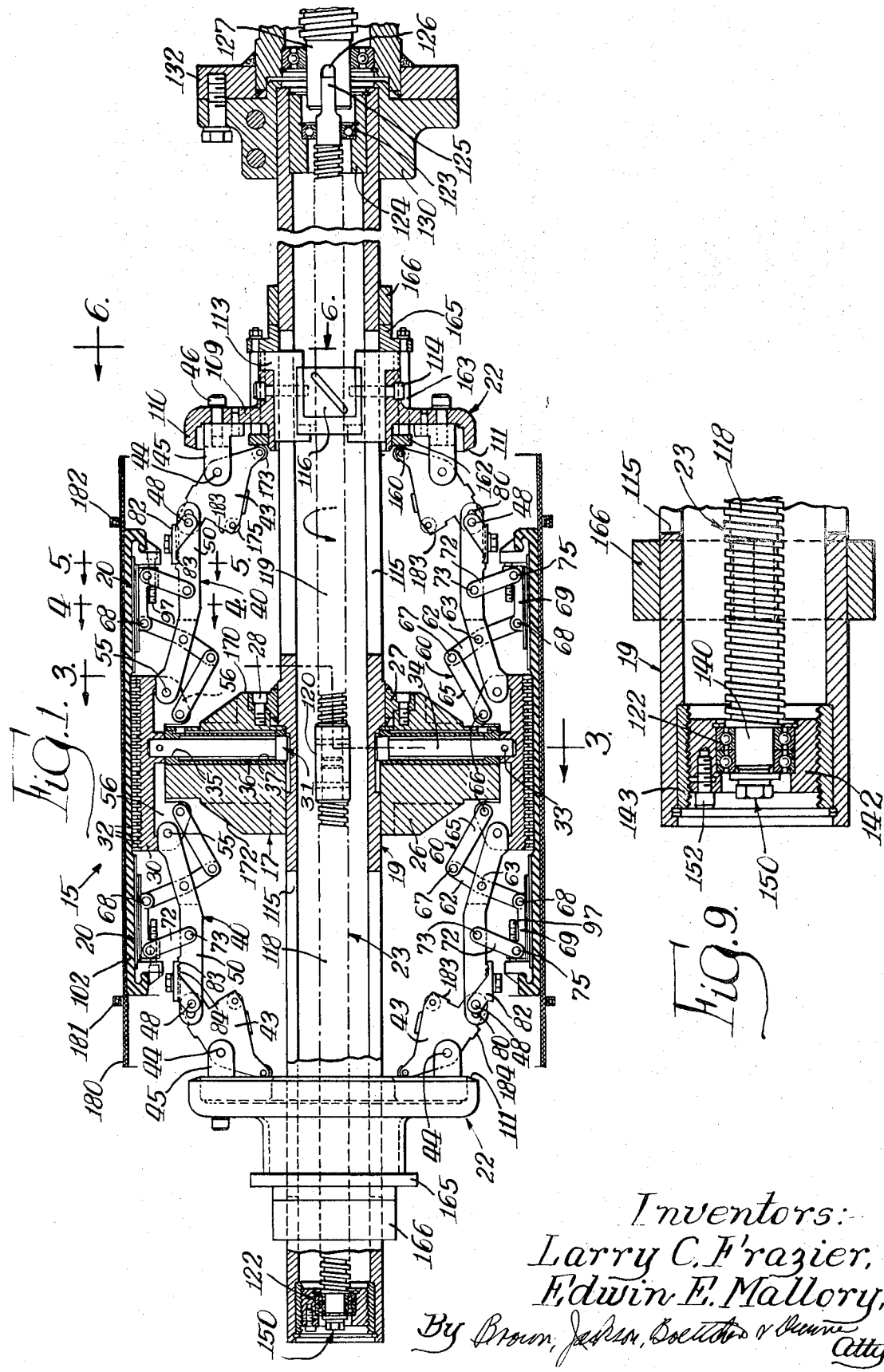

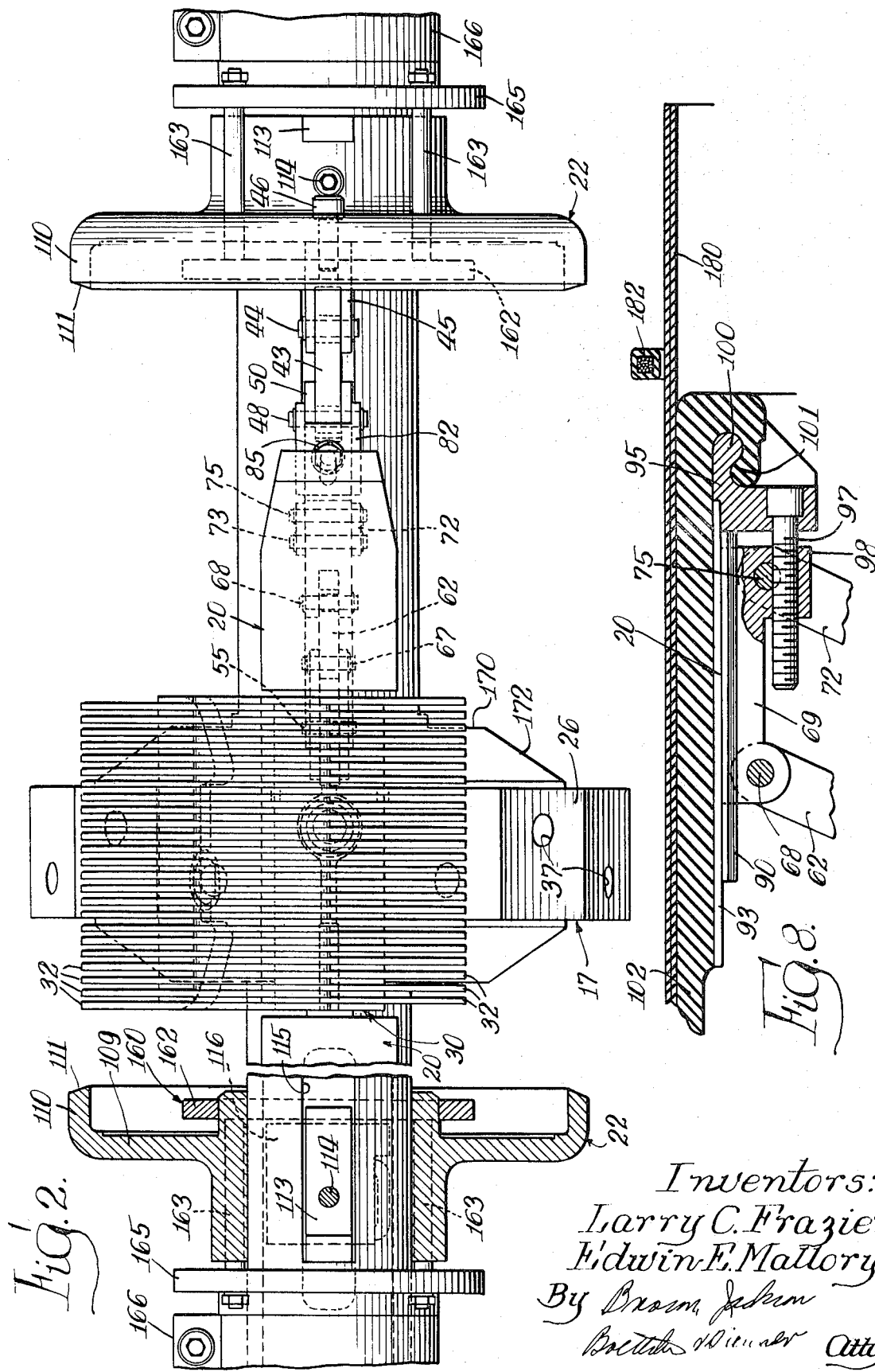

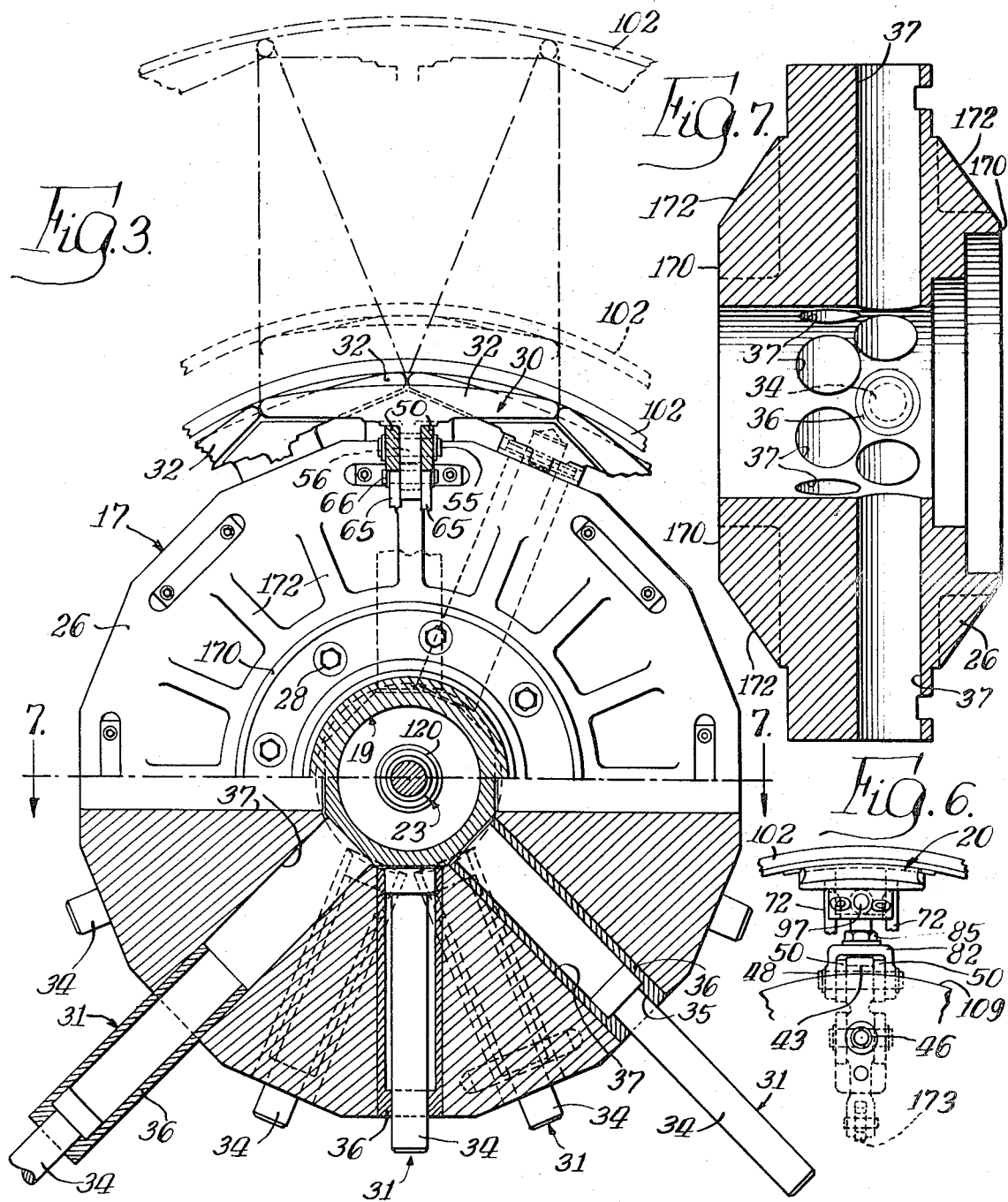

Inventors:
Larry C. Frazier,
Edwin E. Mallory,
By Brown, Jackson, Boettcher & Dienner Attys.

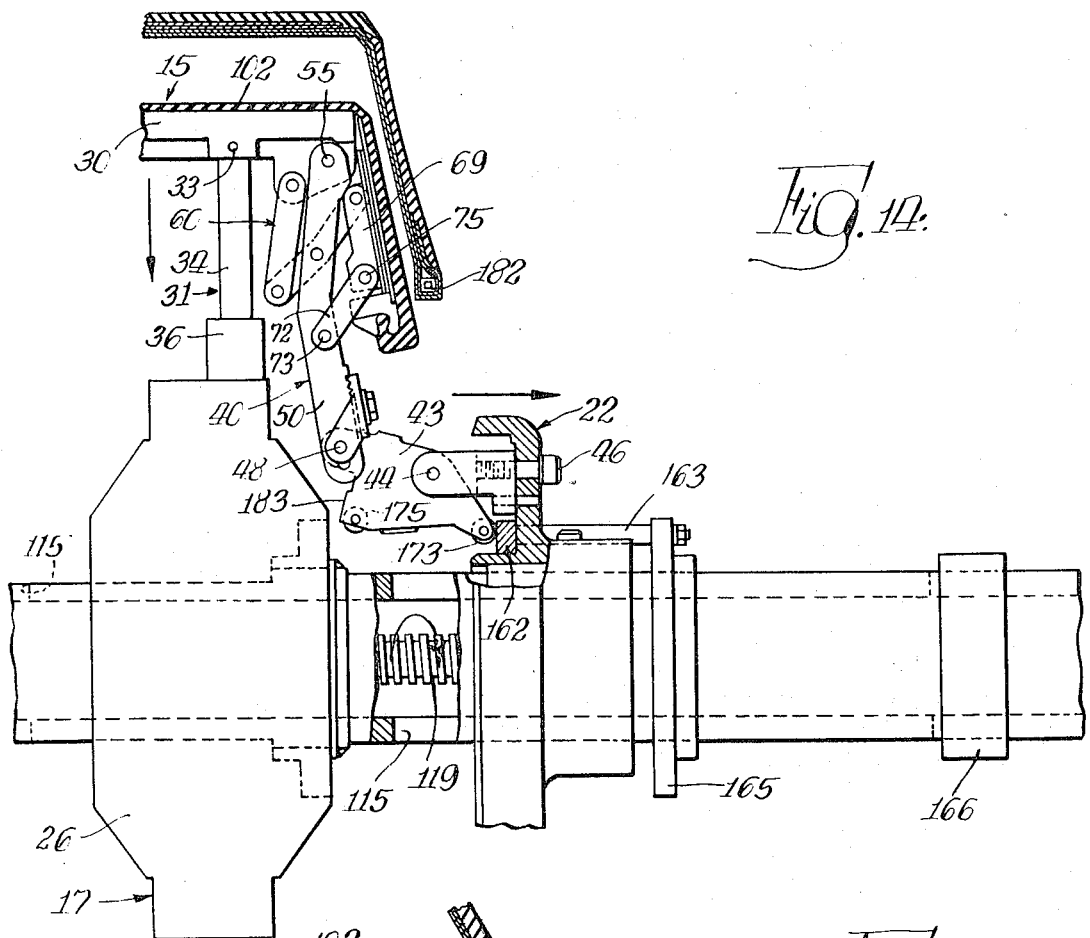
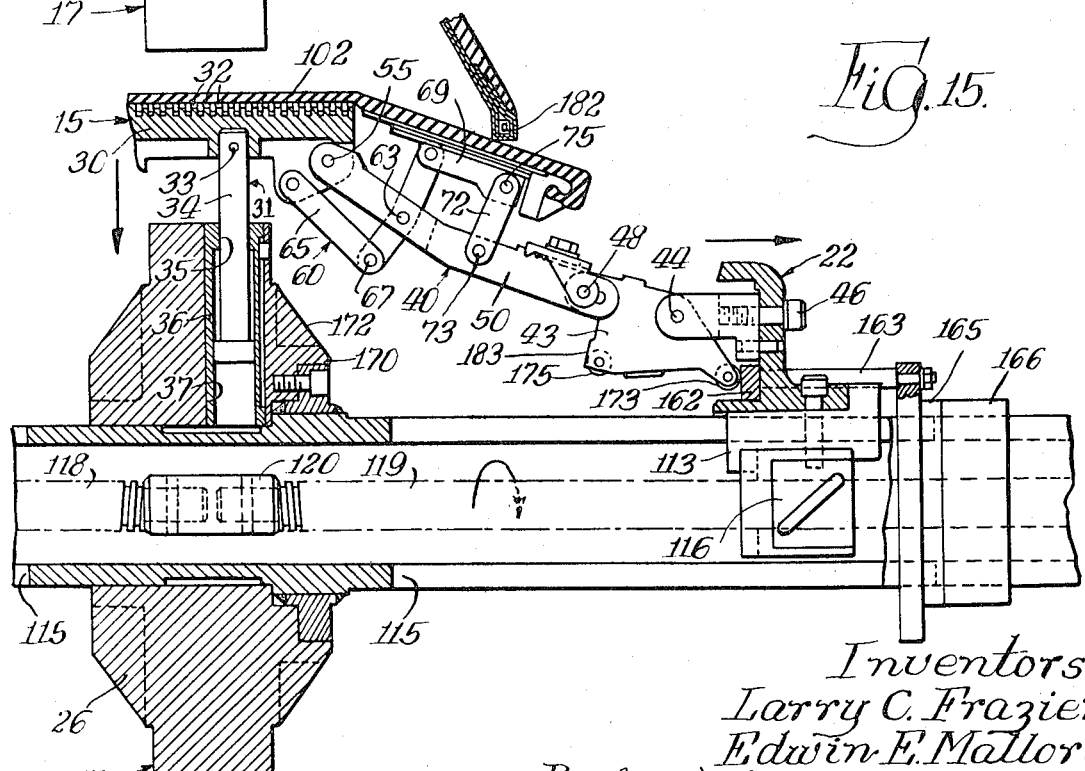

United States Patent Office 3,536,566
Patented Oct. 27, 1970

3,536,566
TIRE BUILDING APPARATUS
Larry C. Frazier, Sun City, Ariz., and Edwin E. Mallory, Niles, Mich., assignors to National-Standard Company, Niles, Mich., a corporation of Delaware
Filed June 21, 1967, Ser. No. 647,732
Int. Cl. B29h 17/06, 17/16
U.S. Cl. 156—415                    16 Claims

ABSTRACT OF THE DISCLOSURE

An apparatus for building pneumatic tires embodying drum means having an intermediate assembly defined by a plurality of circumferentially arranged intermediate supporting sections each comprising a plurality of intermediate supporting members movable radially and circumferentially relative to each other, and a plurality of end supporting members at opposite ends of the intermediate assembly together with end head components at opposite ends of the drum means movable axially toward and away from each other. Force transmitting means provided between the end head components and the intermediate and end supporting members provide for forming the drum means into substantially cylindrical supporting surfaces of varying diameter, and for imparting an annular or torus configuration to the drum means.

---

The invention relates to apparatus for fabricating pneumatic tires starting with tire carcass material of cylindrical configuration disposed around drum means. The tire carcass material may be of a character for building radial tires but, if desired, the apparatus may also be used for building conventional bias angle tires. The invention resides in an arrangement of drum means, axially movable end head components at opposite ends of the drum means, and force transmitting means between the end head components and the drum means to radially displace the cylindrical tire carcass material to provide bead shoulders for incorporating tire beads with the tire carcass material upon predetermined axial inward movement of the end head components, and then radially expanding the central portion of the tire carcass material and axially moving the tire beads toward each other to form the tire carcass material into a torus or annular configuration approximating that of a completed tire by further predetermined axial inward movement of the end head components toward each other. The drum means in its last noted position provides a firm and solid work surface for application of a tread component. The aforementioned force transmitting means provides upon collapsing of the drum means by movement of the end head assemblies away from each other to clear components of the drum means from the tire beads with the drum means collapsing to a diameter less than the diameter of the tire beads to enable removal of the formed tire carcass from the drum means.

It is known in the prior art to displace tire carcass material in the form of a cylindrical configuration into a torus like configuration by means of an inflatable bag of resilient material. A disadvantage of the prior art is that the inflatable bags do not provide solid building surfaces for application of components for the tire to the tire carcass as for example, a tread component. The present invention provides an apparatus in which the drum means is formed of rigid mechanical components which provide rigid supporting surfaces for the various displaced portions of the tire carcass material. The invention is also concerned with the collapsing of the drum means after tire carcass material has been formed as above described to clear the drum components from the tire beads, and to collapse the drum means to a diameter less than the diameter of the tire beads so that the formed carcass material may be easily and conveniently removed from the drum means.

In a preferred embodiment of the invention, the aforementioned intermediate assembly and end supporting members of the drum means in the outer end positions of the end head components define a first cylindrical supporting surface for supporting tire carcass material in the form of a cylinder. First force transmitting means between the end head components and the intermediate assembly, and second force transmitting means between the first force transmitting means, the intermediate assembly and the end supporting members are operative upon predetermined first axial movement of the end head components toward each other to dispose the intermediate supporting members of the intermediate assembly and end supporting members in positions defining a second cylindrical supporting surface of greater diameter than the first cylindrical supporting surface and form bead shoulders for the incorporation of tire beads with the tire carcass material. Following turning up the ends of the tire carcass material over the tire beads, and application of other desired components for a tire to the carcass, such as sidewalls, the aforementioned first force transmitting means upon further predetermined axial inward movement of the end head components function first as bell cranks and then as toggles to dispose the intermediate supporting members radially outwardly to define a third cylindrical supporting surface of greater diameter than the second cylindrical supporting surface and with the second force transmitting means positioning the end supporting members so that the intermediate supporting members and the end supporting members form the tire carcass material into torus or annular configuration. In the radial outermost position of the intermediate supporting members means is provided for tripping the toggles of the first force transmitting means. Upon axial outward movement of the end head components away from each other the intermediate supporting members and the end supporting members may be moved away from and radially inwardly of the carcass without interference with the tire beads and collapsed to a position of a diameter less than the diameter of the tire beads to enable removal of the formed tire carcass from the drum means. Further, the invention comprehends the provision of drum means in which the intermediate assembly is defined by a plurality of circumferentially arranged intermediate sections each comprising a plurality of intermediate supporting members with the intermediate supporting members of the intermediate sections being disposed in the spaces between the supporting members of adjacent intermediate sections for movement radially and circumferentially relative to each other to provide supporting surfaces of variable peripheral extent, a plurality of end supporting members at opposite ends of the intermediate assembly, and cover means covering the outer surfaces of the intermediate and end supporting members to provide a smooth external supporting surface for the drum means.

A preferred embodiment of the invention is shown and described in connection with accompanying drawings in which:

FIG. 1 is a longitudinal vertical sectional view of a pneumatic tire building apparatus, with certain parts shown in elevation, constructed in accordance with the principles of the present invention, and in which the several components of the apparatus are in positions defining a cylindrical surface of predetermined diameter for supporting tire carcass material in the form of a cylinder therearound of predetermined initial diameter;

FIG. 2 is a plan view with certain parts being shown in section, of the apparatus of FIG. 1;

FIG. 3 is a detail vertical sectional view taken substantially along the line 3—3 of FIG. 1 looking in the direction indicated by the arrows and showing progressive radial outward positions of certain of the parts of the apparatus in the construction of a pneumatic tire;

FIG. 4 is a detail vertical sectional view taken substantially along the line 4—4 of FIG. 1 looking in the direction indicated by the arrows;

FIG. 5 is a detail vertical sectional view taken substantially along the line 5—5 of FIG. 1 looking in the direction indicated by the arrows;

FIG. 6 is a detail vertical sectional view taken substantially along the line 6—6 of FIG. 1 looking in the direction indicated by the arrows;

FIG. 7 is a detail horizontal sectional view of the hub of the intermediate assembly of the apparatus of FIG. 1, with the view being taken substantially along the line 7—7 on FIG. 3 looking in the direction indicated by the arrows;

FIG. 8 is an enlarged detail sectional view of shoulder adjustment means for the end supporting members of the drum means of the apparatus of FIG. 1;

FIG. 9 is an enlarged detail sectional view of the parts providing for the adjustable support of one end of a ball screw shaft means for centering end head components of the apparatus of FIG. 1 toward and away from each other;

FIG. 14 is a view similar to FIG. 13 but showing first and second force transmitting means in retracted positions to move components of the drum means away from the formed tire carcass material on the drum means; and FIG. 15 is a view similar to FIG. 14 but showing the position of the parts of the drum means as the drum approaches its collapsed position.

Figure 10:
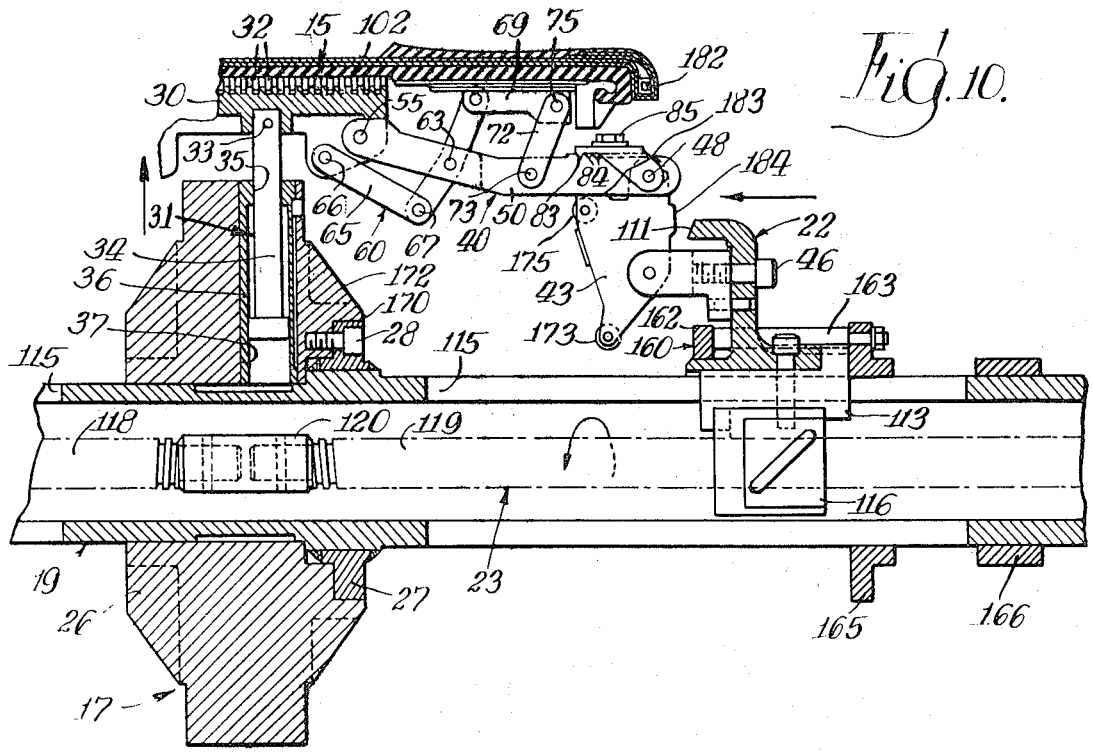
FIG. 10 is a right hand upper corner quarter sectional view of the upper main components of the apparatus of FIG. 1 showing the parts in a position for forming bead shoulders for the setting of tire beads around the tire carcass material.

Referring now to FIG. 1 of the drawings, the tire building apparatus of the invention there shown comprises drum means indicated at 15, which is defined by an intermediate assembly generally indicated at 17, mounted on and for rotation with tubular drum shaft means, indicated generally at 19, and end supporting members, as shown at 20, at opposite sides of the intermediate assembly 17. Left and right hand end components, shown at 22, are drivingly connected with drive shaft means 23 for movement of the end head components 22 axially inwardly toward each other and axially outwardly away from each other to the outer end positions thereof illustrated in FIG. 1. The end head components 22 as will be below described in detail are mounted on drum shaft means 19 for rotation therewith and for axial inward and outward movement with respect to each other through the aforementioned drive shaft means 23.

The intermediate assembly 17 comprises a hub member 26 mounted on drum shaft 19 centrally of the end head components 22 by means of a collar 27 welded to the drum shaft and through which a plurality of bolts 28 threadedly engage hub member 26. The hub member 26 provides for the support of a plurality of intermediate supporting sections 30 each of which, as best seen from FIGS. 2 and 3, comprise a plurality of spaced apart intermediate supporting members 32. The several intermediate sections are arranged in circumferential relation with the intermediate supporting members 32 of adjacent intermediate sections lying in the spaces between the intermediate supporting members of such adjacent intermediate sections. The intermediate supporting members 32 are formed with outer convex circumferential surfaces and these several surfaces in the several radial positions of the intermediate sections with respect to each other, defining supporting surfaces for the building of a pneumatic tire. Each of the intermediate sections 30 is fixedly mounted, as by a pin 33, at the upper end of a guide rod 34 of radial guide means 31. The radial guide means 31 is further defined by a tubular bearing 36, supported in the hub 26 of the intermediate assembly having a bore 35 in which guide rod 34 is mounted for radial inward and outward movement, and which bearing 36, in turn, is supported in a bore 37 in hub member 26 for radial inward and outward movement. The intermediate supporting members 32 of adjacent intermediate assemblies are laterally offset with respect to each other so that the supporting members of each intermediate section is disposed in the spaces between the supporting members of adjacent intermediate assemblies as above described. By reason of the foregoing radial guide means 31 the radial inward and outward movements of the intermediate sections are maintained in fixed radial planes to provide for uniform and symmetrical disposition of the supporting members for movement radially and circumferentially with respect to each other. Thus, the outer surfaces of the supporting members 32 provide a plurality of uniform and accurately disposed supporting surfaces of varying peripheral extent for purposes to be described.

Again, referring to FIG. 1, it will be seen that first force transmitting means, indicated generally at 40, is arranged between each of the intermediate sections 30 and each of the end head components 22. The following description will be limited to the components of but one of such first force transmitting means 40 and the relation of the same to other components of the apparatus in that such components are all the same. Each first force transmitting means 40 comprises first lever means 43 pivoted, as at 44, between the outer ends of an axially inwardly extending bifurcated bracket 45 secured as by bolt 46 to an end head component 22. The first lever 43 is pivoted, as at 48, between the ends of a pair of parallel arms defining a first link means 50, and which arms at their opposite ends are pivoted, as at 55, to a radially inwardly extending lug 56 of an intermediate section 30. Second force transmitting means, indicated generally at 60, comprises second lever means 62 pivoted intermediate its ends at 63 between the arms of the first link means 50 of the first force transmitting means 40. Second link means 65, defined by a pair of spaced apart parallel arms, is pivoted at one end at 66 to the radially inwardly extending lug 56 of intermediate section 30 and at its other end as at 67 to one end of the second lever means 62. The second lever means 62 at its other end is pivoted at 68 between the arms of a bracket 69 of an end supporting member 20. The second force transmitting means 60 further comprises third link means 72 having a pair of parallel arms lying at opposite sides of and pivoted at 73 to first link means 50 of the first force transmitting means 40, and which arm members at their other ends lie at opposite sides of bracket 69 and being pivotally mounted thereto as at 75.

Referring again to FIG. 1, it will be seen that the first force transmitting means 40 incorporates means for adjusting the position of pivot pin 48 between the adjacent ends of first lever means 43 and first link means 50. The outer end of first link means 50 is provided with an elongated slot 80 in which the pivot pin 48 lies. The pivot pin 48 is carried by clamp member 82 which is formed with a detent 83 adapted to be selectively engaged with one of a plurality of teeth or serrations 84 formed in the upper edge of the first link means 40 with the clamp means being adapted to be retained in a selected adjusted position by the bolt means 85. The adjustable positioning of the clamp 82 provides for varying the effective length of the first force transmitting means 40 for purposes described below.

Reference may now be had to FIG. 8 which is an enlarged detail sectional view of one of the end supporting members 20. As seen in the last noted figure, the bracket 69 provides for the support of a mounting flange 90, which as best seen in FIG. 5, has opposite side edges fitting into grooves in the bracket member 69. The flange 90 provides for the support of a superposed thin metal member 93 which again, as best seen in FIG. 5, present an outer convex surface between the side edges of the end supporting members 20. The outer surfaces of members 93 of the several supporting members 20 in the position of the parts as shown in FIG. 1 define, together with the outer surfaces of the intermediate supporting members 32 a substantially cylindrical surface for the support of tire carcass material. The anchor member 95 is axially adjustably secured to the bracket 69 by means of a bolt 97 which has threaded engagement in a threaded boss portion 98 of the bracket 69. The anchor member 95 is formed with a curved outer surface conforming to the curvature of the thin metal member 93, rounded outer end portion 100 and together with a recess 101 inwardly of end portion 100 provide for anchoring opposite end portions of a cylindrical resilient cover 102 formed of rubber or other like material. The cover 102 is in engagement with the outer peripheries of the outer supporting surfaces of the intermediate supporting members 32 and the end supporting members 20 providing, as shown in FIG. 1, a substantially cylindrical supporting surface for tire carcass material. Preferably, the cover 102 at its portions overlying the end supporting members 20 is somewhat thicker than the portion of the resilient cover overlying the outer surfaces of the intermediate supporting members 32 as will be described below. By adjustment of the bolts 97 the anchor members 95 at opposite ends of the drum means 15 may be disposed in axially spaced positions so as to provide an initial cylindrical surface, as in the position of the parts shown in FIG. 1, of varying axial extent for building different sizes of tires as will presently appear.

Referring now to FIG. 1, it will be seen that the end head components 22 each comprise annular disc members 109 having inwardly axially extending flanges 110, the outer edges of which have abutment means, defined by abutment surfaces 111, which as will presently appear are adapted to engage the first lever means 43.

Each disc member 109 is mounted upon a pair of guide blocks 113 by a plurality of bolts 114. The guide blocks are mounted for axial sliding movement in slots 115 formed in the tubular drum shaft 19. The guide blocks 113 provide for the support of ball nuts 116 which engage, respectively, for example, with oppositely threaded ball screws, such as a left hand ball screw 118 and a right hand ball 119 of drive shaft means 23 to provide upon rotation of drive shaft means 23 for the axial inward and outward movement of the end head components 22 toward and away from each other. The left hand ball screw 118 and the right hand ball screw 119 as shown are connected at their inner ends by a connector 120. The outer end of ball screw 118 is journalled in a bearing assembly 122 and outer end of hand ball screw 119 is journalled for rotation in a ball bearing assembly 123 supported in a collar 124 seated, as viewed in FIG. 1, in the open right hand outer end of the drum shaft 19. The outer end of the ball screw 119 is formed with a key 125 adapted to be drivingly engaged in a slot 126 of a drive member 127. The member 127 may be driven in any suitable manner and upon rotation thereof in one direction, rotation is imparted to the left and right hand ball screws 118 and 119 of drive shaft 23 for effecting movement of the end head components 22 toward each other, and upon rotation of drive shaft in the opposite direction the end head components are moved axially away from each other. It will also be observed as viewed in FIG. 1 that a drive collar 130 is secured to the outer right hand end of the tubular drum shaft 19. The collar 130 may be rotated in any suitable manner as, for example, by being bolted to the collar 132 which in turn has connection to a suitable drive source for effecting rotation of the tubular drum shaft 19.

The outer end of the left hand ball screw 118 is mounted to provide for axial adjustment of drive shaft means 23 which is best shown in FIG. 9 and to which reference may now be had. As seen in this figure, the outer end of left hand ball screw 118 is formed with a reduced outer end portion 140 received within the inner races of the ball bearing assembly 122. The outer races of the ball bearing assembly 122 are carried in a nut 142 having threaded engagement with a collar 143 secured adjacent the outer open end of the drum shaft means 19. A bolt and collar assembly 150 secures the ball bearing assembly in position adjacent the outer reduced end 140 of the left hand ball screw 118. A bolt 152 provides for releasing the nut 142 for threading relation with the fix collar 143 providing for axial inward and outward movement of the nut 142 to affect centerline adjustment of the drive shaft means 23.

Referring again to FIG. 1 of the drawings, each of the end head components 22 have associated therewith reset means, indicated at 160, each of which comprise an annular ring 162 carried by axially extending pins 163 which project through openings provided therefore in a disc member 109, and which pin members at their outer ends are secured to a collar 165 mounted for sliding movement on the outer periphery of the drum shaft means 19. A second collar shown at 166 is suitably adjustably clamped to the drum shaft 19 axially outwardly of each of collars 165 and which when engaged by the collar 165 provides for axial inward movement of the rods 163 and the annular rings 162 to engage rollers 173 carried in a bifurcated end portion of first lever means 43.

The intermediate hub 26 at inner radial portions thereof is provided with first guide surface means as at 170 which as will presently appear are adapted to be engaged by the rollers 173 of each of the first lever means 43, and together with a second guide surface means 172 which are adapted to be engaged by rollers 175 carried in a bifurcated mounting portion therefor of each of the first lever means 43 for purposes to be described below.

OPERATION OF THE APPARATUS

In the position of the parts of the apparatus as shown in FIG. 1 the end head components 22 are disposed in their axially outwardmost positions in which the collars 165 of reset means 160 are in engagement with the fixed collars 166 to engage the annular rings 162 with the rollers 173 of the first lever means 43 of the first force transmitting means 40. In this position of the parts the first force transmitting means 40 and the second force transmitting means 60 are disposed in positions in which the intermediate sections 30 are in their innermost radial positions and in which the outer surfaces of the intermediate supporting members 32 and the end supporting members 20 together with the resilient cover 102 define a first cylindrical surface of predetermined peripheral extent for the support of tire carcass material 180 in the form of a cylinder. As shown, the tire material is of an axial length so that outer end portions of the tire carcass material extend beyond the outer ends of the supporting members 20. A pair of tire beads, shown at 181 and 182, are disposed in axially spaced apart relation lying axially outwardly of the outer ends of the end supporting members 20. The tire beads 181 and 182 may be held or supported by suitable known tire bead supporting mechanisms (not shown) in positions as will be described in connection with FIG. 10 to effect the incorporation of the tire beads with the tire carcass material in forming the tire carcass material into a torus or annular configuration substantially conforming to that of a completed tire.

In FIGS. 10 through 15 there is shown but one end head component 22 together with the associated first and second force transmitting means 40 and 60 it being understood, of course, that the parts there shown as above described are arranged between each of the intermediate sections 30, the end supporting members 20, and the end head components 22. The following description shall be limited to but one of the two end head components and associated first and second force transmitting means but it will be understood that the several same assemblies of parts function in a corresponding manner. In FIG. 10 the end head component 22 there shown, as well as the end head component at the opposite end of the apparatus, have been moved axially inwardly toward each other a first predetermined amount to effect rotation of first lever means 43, as seen in FIG. 10, in a clockwise direction about pivot pin with the reaction of the axial inward movement of the end head components being taken by the intermediate sections 30 to effect radial outward displacement of first link means 50 and intermediate sections 30, and through second force transmitting means 60 radial outward displacement of end supporting members 20 to define a second cylindrical supporting surface for drum means 15 of greater diameter and peripheral extent than the first cylindrical supporting surface by reason of the radial and circumferential movement of the intermediate supporting members 32, and the radial outward movement of end supporting members 20. In the position of the parts last noted, bead shoulders are formed at the outer ends of the end supporting members 20 and in this position the outer axial end portions of the tire carcass material have been turned up or folded over the tire beads and over the tire carcass material extending between the end supporting members 20 and the intermediate sections 30. Any suitable mechanisms known in the art may be employed for turning up the carcass material over the tire beads. Also in this position side wall components may, if desired, be applied to the carcass material.

Figure 11:
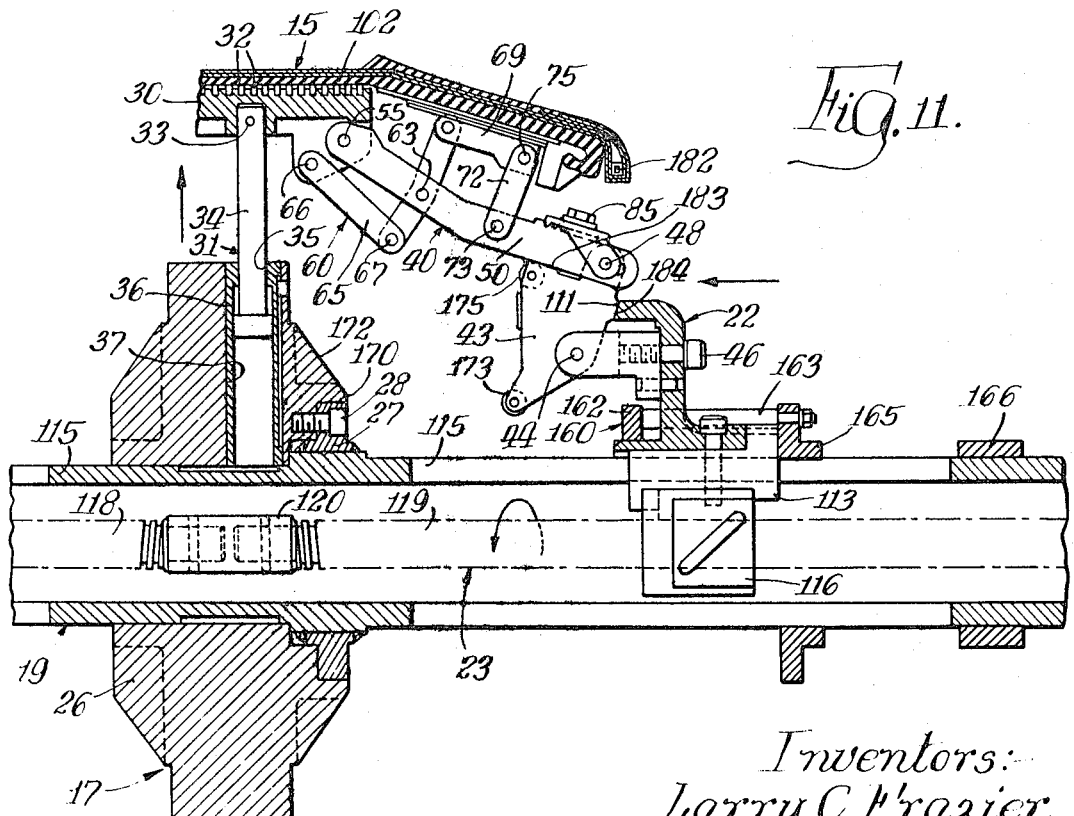
FIG. 11 is a view similar to FIG. 10 but showing the position of the parts in which first force transmitting means of the apparatus of FIG. 1 begins to function as a bell crank for expanding the drum means.

In the position of the parts shown in FIG. 10, it will be seen that the first lever means 43 has an abutment surface portion 183 in engagement with a portion of the surface of the inner edge of first link means 50 so that upon continued inner axial movement of end head component 22 first lever means 43 and first link means 40 function as a bell crank to dispose the first force transmitting means 40 and the second force transmitting means 60 in the positions thereof shown in FIG. 11. In movement of the end head component 22 from the position shown in FIG. 10 to the position shown in FIG. 11 the intermediate sections 30 are being displaced further radially outwardly, and the outer ends of supporting members 20 are moving inwardly toward the axis of the drum and toward the intermediate assembly. In FIG. 11 the first lever means 43 has moved to a position in which a second abutment surface portion 184 thereof has engaged the abutment means 111 of the end head component 22 so that upon further axial inward movement of the end head component 22, first lever means 43 and the first link means 50 form a toggle which effects further radial outward displacement of the intermediate sections 30 and through the second force transmitting means continue to propel the outer ends of the supporting members 20 toward the axis of the drum means and toward the intermediate assembly.

Figure 12:
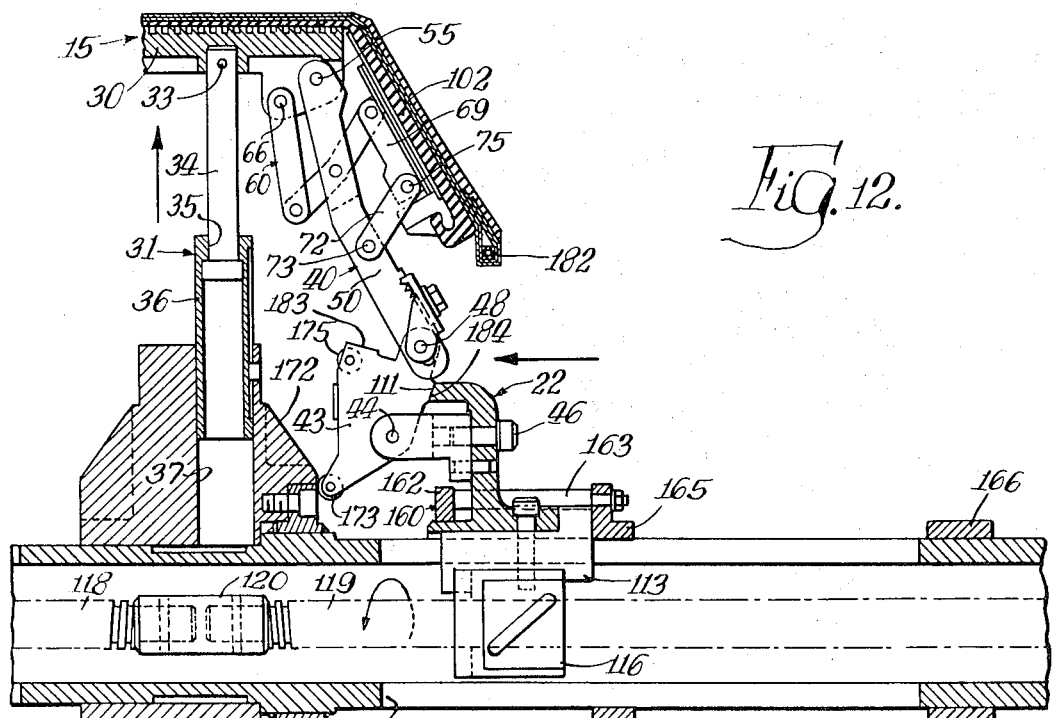
FIG. 12 is a view similar to FIG. 11 but showing the position of the parts further advanced in which the first force transmitting means begins to function as a toggle.
Figure 13:
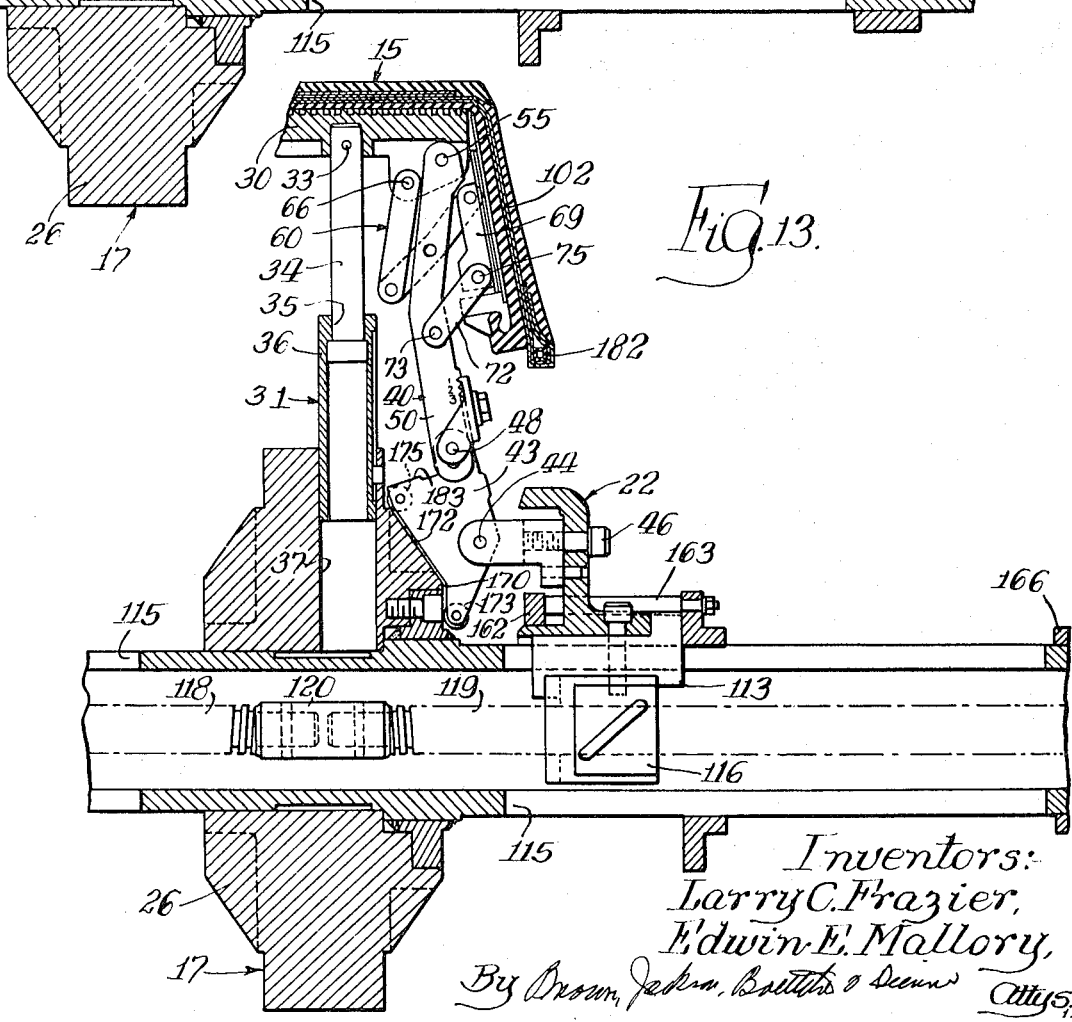
FIG. 13 is a view similar to FIG. 12 but showing the drum means in its maximum expanded position and with the toggle of the first force transmitting over center to collapse the toggle.

As shown in FIG. 12, the roller 173 of the first lever means 43 is in engagement with the first guide surface 170 of hub 26 so that upon further continued predetermined axial inward movement of the end head component 22 to its innermost axial position, the first lever means 43 is caused to be rotated in a counter-clockwise direction until pivot 48, as shown in FIG. 13, passes over the centerline between pivots 55 and 44 to effect breaking of the toggle formed by the first lever means 43 and the first link means 50. In the latter position of the parts the intermediate sections 30 are in their maximum outer radial positions. In the axial inward movement of end head component from the position shown in FIG. 12 to the position shown in FIG. 13, the second force transmitting means 60 through the link means 72 provides a substantially parallelogram type of motion between the end supporting members 20 and the first link means 50 of the first force transmitting means 40. The second lever means 62 and the second link means 65 of the second force transmitting means 60 serve to bring the inner ends of the supporting members 20 in close juxtaposition of the outer side edges of the intermediate sections 30.

In the position of the parts of FIG. 13 other components for a tire may be applied to the carcass material such as the application of a radial band or cincture belt and tread. It will be noted that the intermediate sections in the position of FIG. 13 provide a supporting surface of maximum diameter and maximum peripheral extent and substantially of the desired diameter for the tire. Upon completion of the assembly of components for the tire on the carcass, the end head components 22 are then moved axially outwardly, which as shown in FIG. 14, first effects engagement of roller 175 of first lever means 43 with second guide surface 172 of the intermediate hub 26 to engage roller 173 with annular member 162 of reset means 160 to effect through the first force transmitting means 40 the radial inward displacement of the intermediate sections 30 and the end supporting members 20 to positions away from the tread or crown of the carcass and the side walls of the formed carcass. In the position of the parts as seen in FIG. 14, they have been displaced to positions in which upon further axial outward movement of the end head components 22 the end supporting members follow paths of return movement lying inwardly of the path of movement of the end supporting members in the radial expansion of the tire carcass material. Also, upon the return movement of the parts to their starting positions, the resilient cover 102 having been placed under tension assists in collapsing the structure upon movement of the end head components axially outwardly away from each other. The several parts continue to follow return paths lying inwardly of the forward paths followed in the axial inward movement of the end head components, and as shown in FIG. 15 when the end head components 22 are approaching their outermost axial positions with respect to each other upon engagement of collar 165 with the fixed adjustable collar 166, the parts are disposed in their initial positions for the removal of the formed carcass from the drum means 15. Thus with the parts again in the position shown in FIG. 1, the completed or formed tire carcass may readily be removed since the drum assembly is again of a diameter less than the internal diameter of the tire beads. After removal of the formed tire carcass suitable tire carcass material may again be applied in the form of a cylinder on the drum means 15 for building a succeeding carcass.

It will be noted particularly in connection with FIG. 15 of the drawings that the end head component by reason of the aforedescribed functioning of the first force transmitting means 40 and the second force transmitting means 60 that the end supporting members 20 pass freely under the tire beads and are not impeded thereby.

While there has been shown and described a preferred embodiment of the invention, it will be understood that various modifications and rearrangements may be made therein without departing from the spirit and scope of the invention.

The invention claimed is:

1. Apparatus for building pneumatic tires comprising drum means having an intermediate assembly defined by a plurality of circumferentially arranged intermediate sections each comprising a plurality of intermediate supporting members disposed in spaced apart side-by-side relation with the intermediate supporting members of said intermediate sections being disposed in the spaces between the intermediate supporting members of adjacent intermediate sections for movement radially and circumferentially relative to each other to provide supporting surfaces of variable peripheral extent, a plurality of end supporting members having their inner ends disposed adjacent the outer peripheral end edges of said intermediate sections, a resilient cover covering the outer surfaces of said intermediate supporting members and said end supporting members, and said cover being thicker at the portions thereof covering said outer surfaces of said end supporting members than the portion thereof covering said outer surfaces of said intermediate supporting members.

2. Apparatus for building pneumatic tires comprising a drum shaft, drum means disposed coaxially of said drum shaft, said drum means comprising an intermediate assembly defined by a plurality of circumferentially arranged intermediate sections each comprising a plurality of intermediate supporting members disposed in spaced apart side-by-side relation with the intermediate supporting members of said intermediate sections being disposed in the spaces between the intermediate supporting members of adjacent intermediate sections for movement radially and circumferentially relative to each other to provide supporting surfaces of different peripheral extents, a plurality of end supporting members having their inner ends disposed adjacent the outer peripheries of said intermediate sections, a pair of end head components disposed at opposite ends of said drum means coaxially of said drum shaft and movable axially toward and away from each other between outer and inner end positions, respectively, first force transmitting means between said end head components and each of said intermediate sections of said intermediate assembly for disposing said intermediate supporting members in positions at which the outer surfaces thereof define a plurality of supporting surfaces of different peripheral extents at predetermined inward axial positions of said end head components with respect to each other, and second force transmitting means between said first force transmitting means, said intermediate sections and said end supporting members to dispose the latter with respect to said intermediate sections in the positions of the latter defining a supporting surface of maximum peripheral extent to positions at which the outer surfaces of said intermediate supporting members and said end supporting members form an annulus.

3. The apparatus of claim 2 in which said first force transmitting means comprises first lever means pivoted on said end head components, and first link means pivotally connected to said first lever means and said intermediate sections.

4. The apparatus of claim 3 in which said second force transmitting means comprises second lever means pivoted intermediate the ends thereof on said first link means, second link means pivoted at one end on said intermediate sections, said second lever means being pivoted at its opposite ends at the other end of said second link means and said end supporting members, and third link means pivoted at its opposite ends on said first link means and said end supporting members.

5. The apparatus of claim 2 characterized by resilient cover means covering the outer surfaces of said intermediate supporting members and said end supporting members tending to bias said intermediate supporting members and said end supporting members inwardly toward the axis of said drum shaft.

6. The apparatus of claim 3 comprising connecting means for connecting said first lever means and said first link means to adjust the effective length of said first link means.

7. The apparatus of claim 2 characterized by the provision of adjustment means for varying the effective lengths of said end supporting members.

8. Apparatus for building pneumatic tires comprising a drum shaft, drum means disposed coaxially of said drum shaft, said drum means comprising an intermediate assembly defined by a plurality of circumferentially arranged intermediate sections each comprising a plurality of intermediate supporting members disposed in spaced apart side-by-side relation with the intermediate supporting members of said intermediate sections being disposed in the spaces between the intermediate supporting members of adjacent intermediate sections for movement radially and circumferentially relative to each other to provide supporting surfaces of different peripheral extents, a pair of end head components disposed at opposite ends of said drum means coaxially of said drum shaft and movable axially toward and away from each other between outer and inner end positions, respectively, first force transmitting means between said end head components and each of said intermediate sections of said intermediate assembly, said first force transmitting means comprising first lever means pivoted on said end head components and first link means connecting said first lever means and said intermediate sections, reset means at said end head components for engaging said first lever means of said first force transmitting means in the outer end positions of end head components to dispose said intermediate sections in position at which the outer surfaces of said intermediate supporting members define a first supporting surface of predetermined peripheral extent, said first lever means being operative upon predetermined axial inward movement of said end head components to move said intermediate sections radially outwardly through said first link means disposing said intermediate sections in positions at which the outer surfaces of said intermediate supporting members define a second supporting surface of greater peripheral extent than said first supporting surface, said first lever means upon further predetermined axial inward movement of said end head components toward each other engaging said first link means to form a bell crank therebetween for radially and circumferentially displacing said intermediate supporting members, and end abutment means for said end head components upon further predetermined inward axial movement of said end head components toward each other for engaging said first lever means to form a toggle between said first lever means and said first link means to further radially outwardly and circumferentially displace said intermediate supporting members.

9. The apparatus of claim 8 characterized by said intermediate assembly having first guide surface means engageable by said first lever means at the inner end positions of said end head components to break the toggle between said first lever means and said first link means and dispose said intermediate supporting members in positions at which the outer surfaces of said supporting members define a third supporting surface of greater peripheral extent than said second supporting surface.

10. The apparatus of claim 9 characterized by second guide surface means for said intermediate assembly engageable by said first lever means upon axial outward movement of said end head components from their inner positions to move said first link means radially inwardly to dispose the outer surfaces of said intermediate supporting members in positions at which the outer surfaces of said intermediate supporting members lie radially inwardly of said third supporting surface.

11. The apparatus of claim 8 characterized by the provision of resilient cover means for said intermediate supporting members tending to bias said intermediate sections radially inwardly upon breaking of the toggle between said first lever means and said first link means.

12. Apparatus for building pneumatic tires comprising a drum shaft, drum means disposed coaxially of said drum shaft, said drum means comprising an intermediate assembly defined by a plurality of circumferentially arranged intermediate sections each comprising a plurality of intermediate supporting members disposed in spaced apart side-by-side relation with the intermediate supporting members of said intermediate sections being disposed in the spaces between the intermediate supporting members of adjacent intermediate sections for movement radially and circumferentially relative to each other to provide supporting surfaces of different peripheral extents, a plurality of end supporting members having their inner ends disposed adjacent the outer peripheries of said intermediate sections, a pair of end head components disposed at opposite ends of said drum means coaxially of said drum shaft and movable axially toward and away from each other between outer and inner end positions, respectively, first force transmitting means between said end head components and said intermediate assembly, said first force transmitting means comprising first lever means pivoted on said end head components, and first link means connecting said first lever means and said intermediate assembly, reset means at said end head components for engaging said first lever means of said first force transmitting means in the outer end positions of said end head components to dispose said intermediate setcions in positions at which the outer surfaces of said intermediate supporting members define a first supporting surface of predetermined peripheral extent, said first lever means being operative upon first predetermined axial inward movement of said end head components toward each other to move said intermediate sections radially outwardly through said first link means disposing said intermediate members in positions at which the outer surfaces of said intermediate supporting members define a second supporting surface of greater peripheral extent than said first supporting surface, said first lever means upon further predetermined axial inward movement of said end head components toward each other engaging said first link means to form a bell crank therebetween for radially and circumferentially displacing said intermediate supporting members, and end abutment means for said end head components upon further predetermined inward axial movement of said end head components toward each other for engaging said first lever means to form a toggle between said first lever means and said first link means to further radially and circumferentially displace said intermediate supporting members, first guide surface means at said intermediate assembly engageable by said first lever means at the inner end positions of said end head components to break the toggle between said first lever means and said first link means and dispose said intermediate supporting members in position at which the outer surfaces of said supporting members define a third supporting surface of greater peripheral extent than said second supporting surface, second force transmitting means between said first force transmitting means, said intermediate sections and said end supporting members comprising second lever means pivoted intermediate the ends thereof on said first link means, second link means pivoted at one end on said intermediate sections, said second lever means being pivoted at its opposite ends at the other end of said second link means and said end supporting members, and third link means pivoted at its opposite ends on said first link means and said end supporting members, said second force transmitting means in the outer end positions of said end head components disposing said end supporting members in positions at which the outer surfaces thereof define lateral continuations of said first supporting surface of said intermediate sections and upon said first predetermined axial inward movement of said end head components toward each other to dispose said end supporting members with the supporting surfaces thereof defining lateral continuations of said second supporting surface, and said second lever means, said second link means and said third link means in the axial inward positions of said end head components disposing said end supporting members to positions at which said intermediate supporting members and said end supporting members form an annulus.

13. The apparatus of claim 12 characterized by second guide means for said intermediate assembly engageable by said first lever means upon predetermined axial outward movement of said end head components away from their inner positions to move said first link means and said second force transmitting means radially inwardly.

14. The apparatus of claim 13 in which said second guide means effects engagement of said first lever means with said reset means upon said first predetermined outward axial movement of said end head components and thereby provide upon further continued outward axial movement of said end head components for movement of said intermediate sections radially inwardly, and for outward movement of said end supporting members in paths in which the outer surfaces of said end supporting members lie inwardly of the paths of said outer surfaces of said end supporting member in their movement from said second supporting surface to positions at which said supporting members and said intermediate supporting members form an annulus.

15. The apparatus of claim 2 characterized by said drum means comprising a hub member, and radial guide means between said hub member and said intermediate sections for maintaining radial movement of the latter in fixed radial planes.

16. The apparatus of claim 2 characterized by the provision of means at a predetermined axial inward position of said end head components with respect to each other for disposing said intermediate supporting members with the outer surfaces thereof inwardly of said supporting surface of maximum peripheral extent, and said end supporting members with the outer surfaces thereof inwardly of the sides of said annulus, whereby upon movement of said end head components away from said predetermined axial inward positions of said end head components, the outer surfaces of said end supporting surfaces lie in paths inward of the paths of said outer surfaces of said end supporting members in the axial inward movement of said end head components with respect to each other.

References Cited

UNITED STATES PATENTS

| 2,603,581 | 7/1952 | Ericson et al. | 156—415 X |
| 3,160,546 | 12/1964 | Burton | 156—417 X̄ |
| 3,414,446 | 12/1968 | Pearce et al. | 156—132 X |
| 3,433,695 | 3/1969 | Caretta et al. | |

FOREIGN PATENTS

| 280,640 | 11/1927 | Great Britain. |
| 983,349 | 2/1965 | Great Britain. |

BENJAMIN A. BORCHELT, Primary Examiner

S. C. BENTLEY, Assistant Examiner

U.S. Cl. X.R.

156—420